Figure 1:
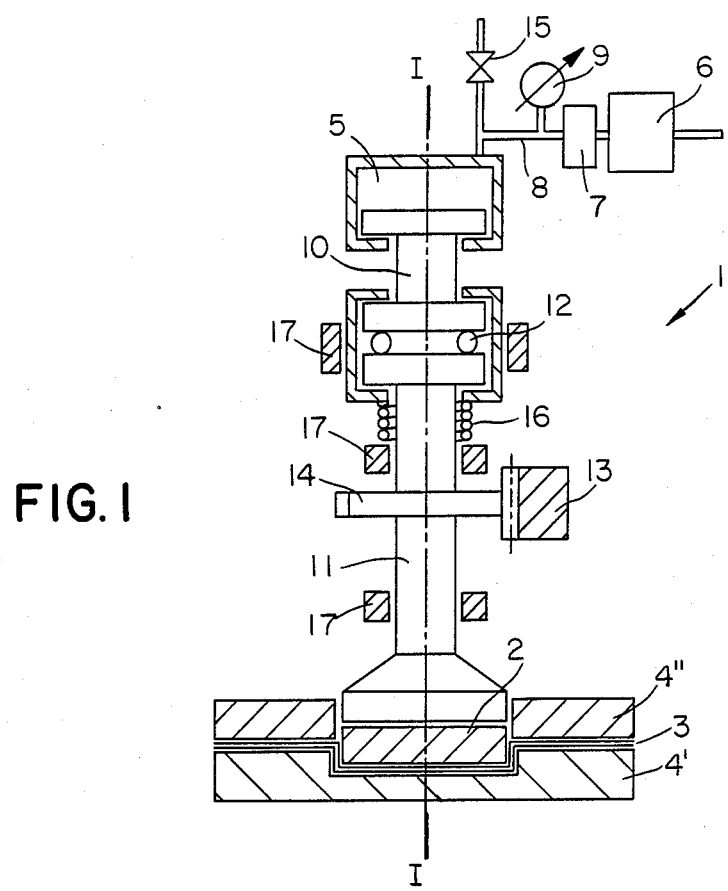

United States Patent [19]

Illy

[11] Patent Number: 4,852,333
[45] Date of Patent: * Aug. 1, 1989

[54] METHOD FOR MAKING A GROUND COFFEE DISCOID PAD

[75] Inventor: Ernesto Illy, Trieste, Italy

[73] Assignee: Illycaffe' S.p.A., Trieste, Italy

[*] Notice: The portion of the term of this patent subsequent to Dec. 3, 2002 has been disclaimed.

[21] Appl. No.: 123,913

[22] Filed: Nov. 23, 1987

[30] Foreign Application Priority Data

Nov. 25, 1986 [IT] Italy .................. 22456A/86

[51] Int. Cl.⁴ .................. B65B 29/02; B65B 1/24; B65B 47/02
[52] U.S. Cl. .................. 53/436; 53/453; 426/414; 426/454; 426/468
[58] Field of Search .................. 53/436, 453, 527, 528, 53/554, 559, 553; 426/414, 432, 454, 464, 468, 473, 512, 514

[56] References Cited

U.S. PATENT DOCUMENTS

| | | | |
|---|---|---|---|
| 1,210,542 | 1/1917 | Savageau | 426/454 X |
| 2,235,315 | 3/1941 | Donnelly | 426/454 |
| 2,345,320 | 3/1944 | Brenzinger | 426/454 |
| 2,371,093 | 3/1945 | Willison | 426/454 |
| 2,372,406 | 3/1945 | Treneer | 53/436 X |
| 3,121,635 | 2/1964 | Elred | 426/454 X |
| 3,579,350 | 5/1971 | Rudd et al. | 53/527 X |
| 3,846,569 | 11/1974 | Kaplan | 53/554 X |
| 4,254,694 | 3/1981 | Illy . | |
| 4,555,894 | 12/1985 | Illy | 53/528 |
| 4,747,250 | 5/1988 | Rossi | 53/528 X |

Primary Examiner—Horace M. Culver
Attorney, Agent, or Firm—Keil & Weinkauf

[57] ABSTRACT

A method for making a ground coffee discoid pad for brewing an express coffee wherein a pressure means applies a pressure to a coffee pad placed in a pocket made of water and air permeable material and simultaneously rotates in contact with the coffee surface about an axis perpendicular to said surface and the applied pressure ranges from 22 to 65 atmospheres.

2 Claims, 1 Drawing Sheet

METHOD FOR MAKING A GROUND COFFEE DISCOID PAD

This present invention relates to a method for making a ground coffee discoid pad wrapped between two layers of water and air permeable material to brew an express coffee.

The applicant is the owner of U.S. Pat. No. 4,254,694 which discloses a coffee discoid pad made up under a pressure not less than 15 atmospheres. Also a number of machines are known that carry out methods for making a coffee discoid pad. The applicant is also owner of U.S. Pat. No. 4,555,894 which discloses a machine wherein a measure of ground coffee, delivered from a dispenser in a pocket formed in a web of suitable paper material, is subjected to a first compression to form a coherent coffee pad and immediately after a pressure means definitively presses said pad while simultaneously rotating about its own longitudinal axis. The pressure that said pressure means applies to the coffee is not specified although the force applied to a discoid pad having a not specified diameter is mentioned.

The machine disclosed by the above patent makes a more or less compact discoid pad, depending on the pressure applied by the pressure means.

The drawback in the discoid pads subjected to pressures usual in the art, from few atmospheres up to 10 atmospheres, resides in that the dimensions are not constant and the compactness is not homogeneous, whilst in the case the discoid pad is subjected to pressures ranging from 10 to 18 atmospheres said drawback is not present. A drawback common to all known discoid pads is that the coffee deteriorates after a certain time period even if the discoid pads are packed in a vacuum container. If, then, a lot of vacuum packed discoid pads gets in touch with air after container opening and the lot is not rapidly consumed, then the coffee spoils after a short time. In fact, the air passage through the paper material layers that cover the coffee causes the latter to be oxidated and the coffee beverage to become of poor quality.

The discoid pad as made by the invented method obviates said drawback.

The method for making a discoid pad of ground coffee comprises in a known way the steps of: forming a pocket in a lower web of water and air permeable material placed in a molding plate concavity, depositing a measured heap ground coffee measured heap in said pocket, squashing said heap to transform it into a coffee pad, applying a pressure to transform said coffee pad into a coherent well compacted element, covering said element with an upper web of a water and air permeable material and, finally, fixing said lower and upper webs to each other along the perimeter of said coffee element and comprises in a new way: applying to the coffee pad a maximum pressure such that the oily substances on and in the coffee granules fill up uniformly all the interstices between said granules in the whole coherent coffee element.

The maximum pressure as required to attain the above effect is determined experimentally for each coffee blend as prepared for making a lot of discoid pads. In fact said maximum pressure depends on the coffee quality, roasting stage, granulometry as provided by grinding, thickness of the pad, humidily degree in the ground coffee and said pressure will range from 22 to 65 atmospheres. From each lot of a certain coffee blend there is provided a certain quantity of coherent coffee elements or of coffee discoid pads that are subjected to pressure trials to determine the maximum required pressure.

The advantage of the invented method resides in that the oily substances, by permeating all the interstices between the individual coffee granules, provide a space closed by a continuous oily surface substantially coincident with the peripheral surface of the coherent coffee element so that the oily particles on said continuous surface may oxidize on contact with the air passed through the permeable material covering said element, but work as a barrier against the oxidation proceeding towards the interior of the coherent element. Such a continuous oily surface allows a discoid pad to maintain its own aromatic properties much longer than a discoid pad produced by one of the known methods.

Figure 2:
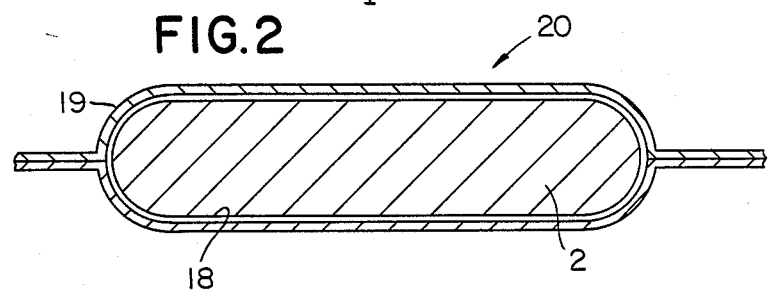
Figure 3:
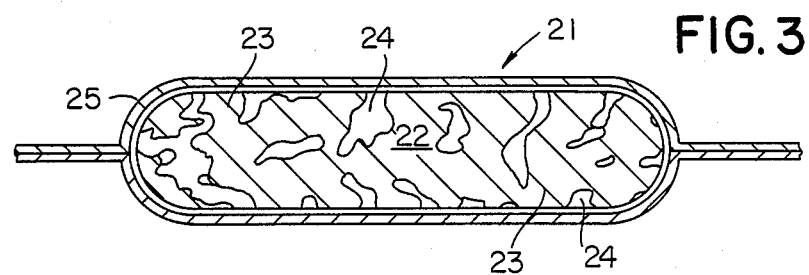

The invention is described in detail herebelow by means of an example and with reference to the drawings wherein:

FIG. 1 is a diagrammatic side elevation view of a pressure means which is operating on a coffee pad, FIG. 2 is a cross section view of a discoid pad obtained by the invented method and FIG. 3 is a cross section view of a conventional discoid pad.

FIG. 1 shows a pressure means 1 applied on a ground coffee pad 2 that is placed in a pocket formed along a paper strip 3 in a concave receptacle in a lower plate 4' and has its upper peripheral part contained by an upper plate 4".

The ground coffee pad 2 is formed by a coffee blend of washed and non-washed arabic quality, coming from Africa and Latin America; the coffee is treated by discontinuous roasting for 13 minutes; the granulometry as obtained by grinding is: al least 75% in weight having a diameter of less than 0.4 mm and from 20% to 55% in weight having diameter less than 0.1 mm; a thickness of 10 to 11 mm; a humidity in the coffee after grinding of: less than 1%. The maximum pressure as applied, experimentally determined in order to have the whole pad permeated by oily substances, is about 40 Kg/sq.cm.

As disclosed by said U.S. Pat. No. 4,555,894 the pressure means 1 is pressed on the upper surface of the coffee pad 2 when a pressurized fluid is delivered into the chamber 5 from a compressed air source 6, through a pressure reducing valve 7, along the duct 8. A pressure gauge 9 controls the air pressure. The shafts 10 and 11 of the pressure means 1 are coaxial and a thrust bearing 12 permits the shaft 11 to be rotated about axis I—I by a rack 13 meshing with a gear 14 fixed to shaft 11, the means which move said rack not being shown. Shaft 11 is rotated while pressure means 1 presses the coffee pad 2, as explained in detail in said patent. As conventional control means, not shown, discharge air from chamber 5 through a valve 15, the helical spring 16 lifts the pressure means 1. By reference number 17 guide means for shafts 10 and 11 are indicated.

FIG. 2 shows a coffee discoid pad 20 produced by a pressure means that applies to the coffee pad 2 a maximum pressure of 40 Kg/sq.cm. and shows that the oily substance fills up all the coffee pad, viz. all the part sectioned in the figure. It will be appreciated, consequently, that the conditions for this discoid pad, as far as air attack on coffee is concerned, are equivalent to the conditions of a coffee pad comprised in a space closed by a continuous surface 18 of oily substances. This surface 18 will be ozidized by air penetrating through the paper material 19, but will prevent the oxidation from proceeding into the pad.

FIG. 3 shows a coffee discoid pad 21 produced by applying to a coffee pad a pressure according to one of the known methods, lower than 22 atmospheres. Oily substances show having permeated the coffee in an irregular manner, discontinuous in the coffee pad 22. The parts 23 permeated by oily substances, shown by hatching in the figure, are in some regions spaced one from another and they also present skin discontinuances 24 which allow air to penetrate the pad interior. It will be appreciated that such a discoid pad is subject to rapid spoiling. The paper material wrapping pad 22 to form discoid pad 21 is designated by 25.

I claim:

1. Method for making a ground coffee discoid pad for brewing an express coffee, comprising the steps of:
   placing a lower web of water-and-air permeable material in a molding plate concavity to form a pocket in said web,
   positioning a measured heap of ground coffee in said pocket,
   squashing said heap to transform it into a coffee pad,
   applying a pressure to transform said coffee pad into a coherent, well compacted element,
   covering said element with an upper web of water-and-air permeable material, and
   attaching said lower and upper webs to one another along the perimeter of said coffee element,
   wherein in said step of transforming said coffee pad into a coherent, well compacted element, the applied pressure is driven up to a maximum pressure in the range of from 22 to 65 atmospheres such that oily substances on and in the coffee granules uniformly fill up all the interstices between said granules in the entire coherent coffee element, thereby providing a space closed by a continuous oily surface substantially coincident with the peripheral surface of the coherent coffee element, with the oily particles on said continuous surface acting to oxidize on contact with the air passed through the permeable material covering said element, but working as a barrier against the oxidation proceeding towards the interior of the coherent element.

2. Method according to claim 1, wherein said pressure applying step includes subjecting each coherent element in a group of n such elements all having the same dimensions and compactness homogeneity and all being made with the same coffee brand having the same roasting stage, the same granulometry and the same humidity contents to a maximum pressure, different from pressure applied to the other elements in said group and ranging from 22 to 65 atmospheres in order to determine that one of the n maximum pressures that causes the interstices between said granules to be uniformly filled up by oily substances in the entire coffee coherent element.

* * * * *